June 3, 1930.  E. C. WILSON  1,760,930
WELL PIPE COUPLING
Filed Feb. 12, 1923   2 Sheets-Sheet 1
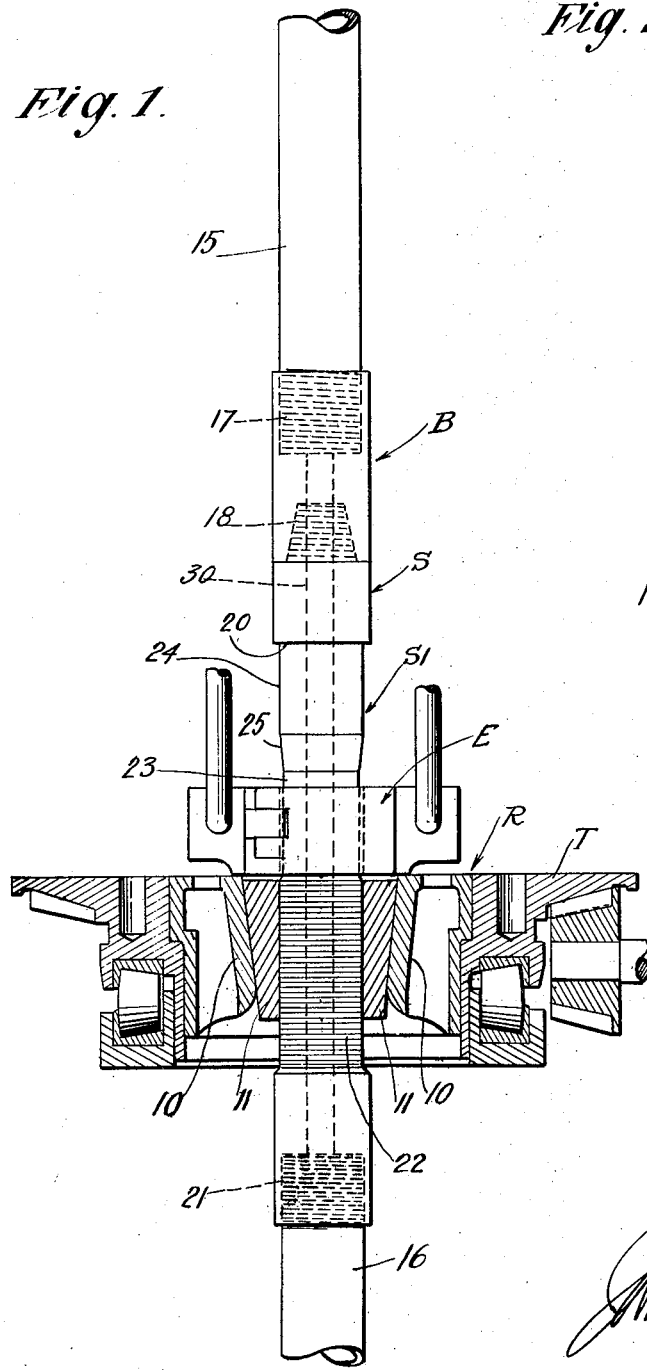
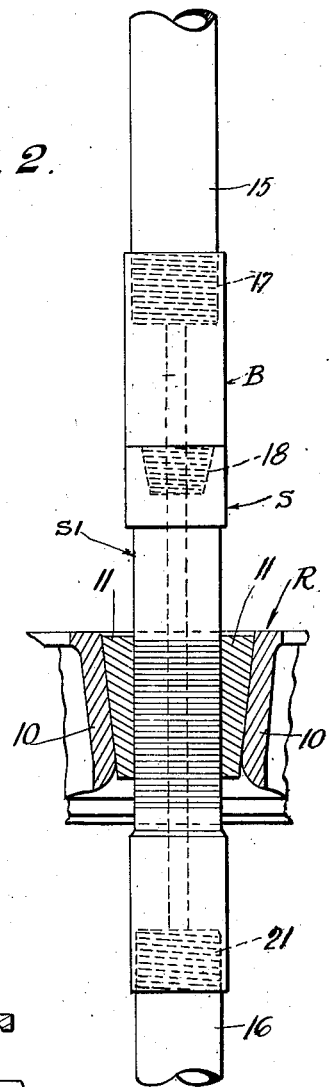
Inventor.
Elihu. C. Wilson.
by James T. Buckelew
his Attorney.

June 3, 1930.  E. C. WILSON  1,760,930
WELL PIPE COUPLING
Filed Feb. 12, 1923   2 Sheets-Sheet 2
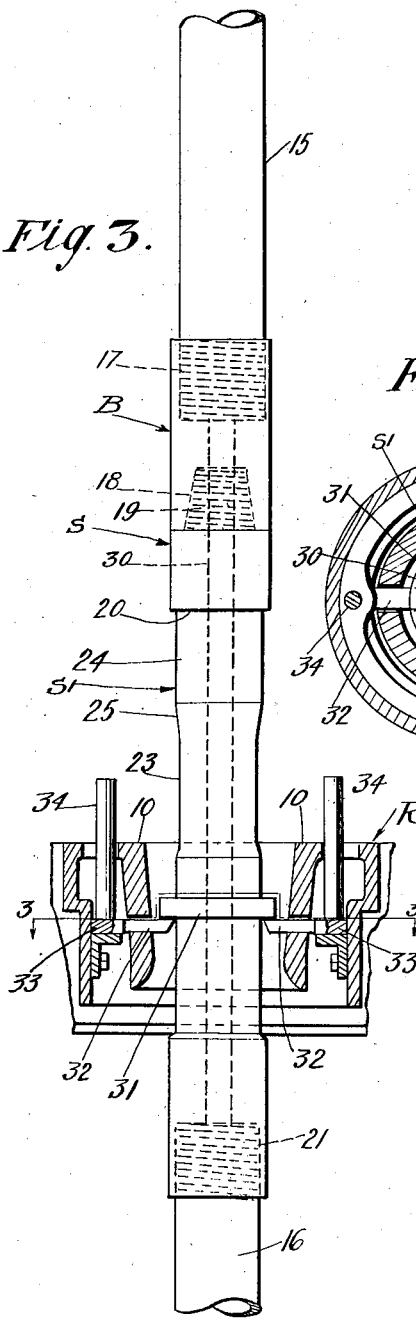
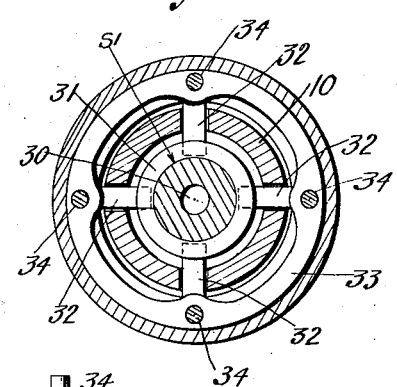
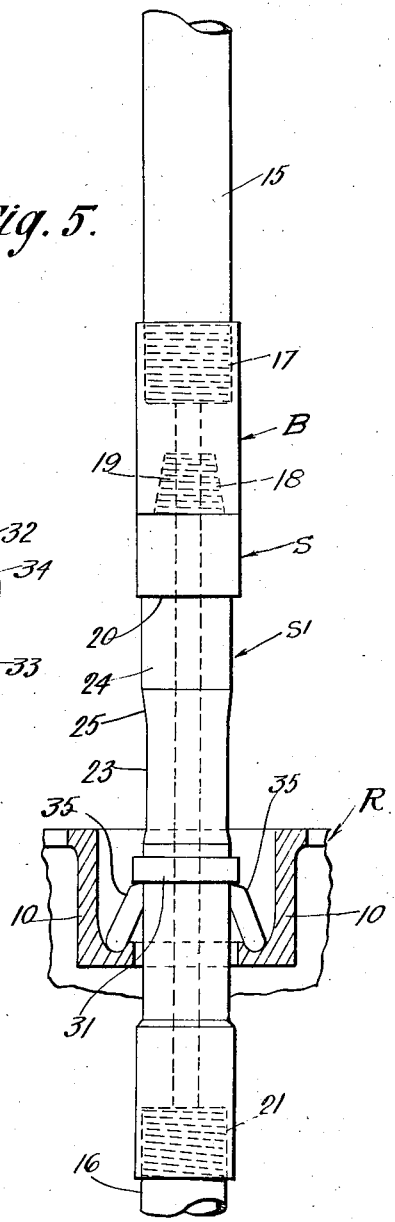
Inventor
Elihu. C. Wilson
his Attorney Patented June 3, 1930

1,760,930

UNITED STATES PATENT OFFICE

ELIHU C. WILSON, OF LOS ANGELES, CALIFORNIA

WELL-PIPE COUPLING

Application filed February 12, 1923. Serial No. 618,694.

This invention has to do with devices for providing couplings between adjacent lengths or rotary drill pipes, well pipes or the like; and it may be stated as a general object of the invention to provide a type of coupling that will facilitate the making and breaking of the connection between adjacent pipe lengths and at the same time obviate all liability of deformation or injury to the pipe by reason of the strain that must necessarily be imposed in order to set up a tight joint and to break a tightly set joint.

Heretofore, so far as I am aware, it has been usual to use a coupling device between pipe lengths that obviates the necessity of repeatedly screwing or unscrewing the threaded joints at the pipe itself; two coupling members being provided that are more or less permanently threaded upon the ends of the pipe lengths and these two coupling members being provided with a taper threaded pin and box. But even where such coupling devices are used, the pipe itself is subjected to excessive strains that often deform or weaken the pipe. These strains are commonly due to the fact that the pipe itself must be engaged by the supporting slips of the rotary rig, and the weight of the whole string of pipe being carried repeatedly on these slips, the pipe each time is slightly crushed or crimped, which causes crystallization, or fatigue of the metal, thereby greatly weakening the pipe causing it to collapse at those points when the rotating power is applied. When this "twist off" occurs the results are very serious and expensive. Furthermore, it has been common practice in screwing up and unscrewing the couplings to use the slips, engaged with one length of pipe, either to hold that length stationary while the adjacent length is rotated or to rotate that length while the adjacent length is held stationary; and this rotational strain applied directly to the pipe, often has the same effects. Furthermore, any deformation of the pipe makes difficult or impossible the application of the pipe elevator and any weakening of the pipe may cause it to break when the weight of the whole string is supported on the elevator.

My invention overcomes these difficulties and obviates these disadvantages, in that it provides a form of coupling member that may be made very heavy and sturdy in structure and that cannot be injured in any manner by the weight strains or the rotational strains imposed upon it.

Other objects and features of the invention will be best understood from the following specification wherein I describe specific and preferred forms of device illustrative of my invention, reference for this purpose being had to the accompanying drawings in which—

Fig. 1 is a vertical longitudinal section showing a typical form of rotary drilling mechanism with my improved pipe coupling in position in it.

Fig. 2 is a similar but fragmentary view showing a modified form of the invention; Figs. 1 and 2 showing the invention in use with the usual pipe supporting slips;

Fig. 3 is a similar view showing a further modified form of the invention and showing a modified device to take the place of the slips;

Fig. 4 is a section on line 4—4 of Fig. 3; and

Fig. 5 is a view showing another modification of device to support the pipe.

In the drawings I show at R a rotary drilling mechanism of a typical kind. This rotary drilling mechanism has a rotary table T and inside the table there is a stationary slips ring 10 in which wedge slips 11 are placed and operate to clamp the drill pipe or stem. These wedge slips 11 may be of any of the ordinarily known kinds and it is their function by their wedging action to grip the pipe and support it and also to grip the pipe tightly enough to keep the pipe from rotating relative to the slips. In the particular instance here shown the slips and slip ring are rotatively stationary; in some types of rotary drilling apparatus the slips and slip ring have been rotatable for the purpose of screwing and unscrewing lengths of pipe; but in any case the slips must tightly engage the pipe, and it is this forcible engagement repeatedly applied that finally weakens or crystallizes the pipe, and breakages or twistoffs occur when the rotative power is applied.

In the usual arrangement, when pipe is being hoisted out of or lowered into the well the pipe elevator E is placed around the pipe directly above the slips or directly above the rotary drilling apparatus, below a collar on the upper end of the length of pipe that is engaged by the slips. I indicate elevator E in such a position in Fig. 1.

Fig. 1 shows a string of pipe as it appears when being hoisted out of or lowered into the well. An upper length of pipe (extending up into the derrick) is shown at 15, while the lower joint (the length at the upper end of the string extending down into the well) is shown at 16. It is usually this lower length 16 that is engaged by slips 11. I provide, between these two pipe lengths, a coupling device comprising two members B and S, the upper member B, as shown in Fig. 1, having a screw threaded box 17 that is more or less permanently screwed onto the lower end of pipe length 15 and also having a taper threaded box 18 at its lower end. The member S has at its upper end a taper threaded pin 19 to enter box 18; and then below its upper end it has a downwardly facing shoulder 20, and below that shoulder a comparatively long shank S1 that extends down to the pipe thread box 21 at the lower end of this member, where this member more or less permanently joins with pipe length 16.

On the lower part of the shank S1 I may provide peripheral corrugations or grooves or the like as indicated at 22, for the purpose of enabling the slips to get a good grip. These corrugations are not necessary as wedge slips will engage a smooth surface; but they may be desirable, and my structure enables me to provide them without unduly weakening the device. Immediately above the portion of the shank intended to be gripped by the slips there may be a reduced portion 23, somewhat smaller in diameter than the uppermost portion 24 of the shank. Between these two portions 23 and 24 there may be a tapered portion 25. This provision is made to facilitate placement of elevator E around the shank, the elevator being very easily placed around the reduced shank portion 23, and latched closed, because of the freedom allowed by the slight reduction of diameter of part 23. Then, when the elevator is moved upwardly on the shank, it slips easily onto full sized part 24, fitting that part with full accuracy and closeness and is thus properly aligned to bear upwardly in full shouldering engagement with shoulder 20.

Suppose now that the pipe is being raised or lowered in the well and the parts are in the position shown. If the pipe is being raised, the joint at 18—19 is broken, and the upper pipe length 15 removed. In breaking this joint the tongs may be applied to the upper coupling member B and the coupling joint member S may be held from rotation by the slips, or may be held from rotation by another tongs applied thereto. Application of rotary strain to these parts cannot injure them as they are constructed preferably of forged steel, and very heavily. The longitudinal water passage 30 through the joint members is small enough to leave a comparatively great thickness of wall, as is apparent in the drawings; consequently these parts can stand many times the strain that would injure the pipe itself. This great wall thickness also enables me to provide the corrugations at 22 without materially weakening the shank. Such corrugations are not possible on pipe owing to the extreme weakness thereby induced in its relatively thin wall. Furthermore, the wall thickness of the shank makes it possible to provide the elevator shoulder 20.

After the upper length of pipe has been removed then the elevator E is applied, drawn up to position under shoulder 20, and then the whole string of pipe is raised until the next coupling is reached. It will be understood that it is not necessary to place one of my coupling devices at each successive joint between lengths of pipe, as pipe is usually handled in units comprising three or four pipe lengths. Consequently, the coupling device need only be placed every third or fourth joint and the other joints formed by pipe collars of any other suitable device. Consequently, the pipe string is then raised by the elevator until the next coupling device comes into the position shown in Fig. 1, when the slips are again set and the weight of the entire string is then carried by the slips while the foregoing operation is repeated. The heavy and sturdy construction of the shank S1 here again comes into play in resisting injury by the inward gripping force of the slips.

In Fig. 2 I show a modification to the extent that the arrangement of box 18 and taper pin 19 is reversed, the pin being in the upper member B and the box being in the lower member S; and also that the reduced part 23 of the shank is omitted.

In Fig. 3 I show how my coupling device may be modified to use a supporting means other than slips. For instance, a downwardly facing shoulder may be provided on shank S1 at 31, and the ring 10 may carry dogs or similar members as shown at 32 that can be moved inwardly under shoulder 31. For instance, these dogs may be surrounded by a cam ring 33 that may be rotated through the medium of a pin or pins 34.

Likewise in Fig. 5 I show a similar arrangement of the coupling devices with a downwardly facing shoulder 31, under which supporting pawls or catches 35 may engage, as is clearly illustrated in that figure. The form of the invention illustrated in Figs. 3, 4 and 5, while included in the broader claims appended, is specifically the subject matter of my application, Serial No. 745,168, filed Oct. 22, 1924; the specific claims in this present application being directed to the slips supported form of Figs. 1 and 2, while the broader claims include both forms.

Having described a preferred form of my invention, I claim:

1. A well pipe coupling device, comprising two members having their upper and lower ends, respectively, adapted for connection with pipe lengths, and having at their other ends means to make a breakable joint between the two members, the lower one of the members having a relatively long and heavy shank between its two ends, said shank including a lower substantially cylindric zone engageable by supporting slips, and having, near its upper end, a downwardly facing elevator engageable shoulder, which shoulder is spaced by an elevator engageable zone above the slip engageable zone.

2. A well pipe coupling device, comprising two members each having one end adapted for connection with a pipe length, and having at their other ends means to make a breakable joint between the two members, one of the members having a relatively long and heavy shank between its two ends having a lower zone to be engaged by supporting slips and having near the upper end of the shank, and spaced above the slip engageable zone, an elevator engageable zone, a downwardly facing shoulder adapted to be engaged by a pipe elevator, and having below said shoulder a downwardly tapered and reduced portion for the purposes described.

3. A well pipe coupling device adapted to connect together lengths of well pipe in a string, comprising two members having their upper and lower ends, respectively, adapted for connection with pipe lengths, and having at their other ends means to make a breakable joint between the two members, the lower one of the members having a relatively long shank between its ends, said shank having near its lower end a part adapted to be engaged by supporting means and having thereabove a zone adapted to be engaged by an elevator and a downwardly facing elevator engaging shoulder above said zone.

4. A well pipe coupling device, comprising two members each having one end adapted for connection with a pipe length, and having at their other ends means to make a breakable joint between the two members, one of the members having a relatively long shank between its ends, said shank having near its lower end a part adapted to be engaged by supporting means and having thereabove two elevator engageable zones one above the other, the lower being reduced with relation to the upper and the shank having a taper between said two zones, and the shank having above the upper of said zones a downwardly facing elevator engageable shoulder.

5. A well pipe coupling device, comprising two members having their upper and lower ends respectively adapted for connection with pipe lengths, and having at their other ends means to make a breakable joint between the two members, the lower one of the members having a relatively long and heavy shank between its two ends having a lower circumferentially grooved zone adapted to be engaged by supporting slips and having an upper shoulder spaced above the slip engaged zone by an elevator engageable zone and adapted to be engaged by a pipe elevator.

6. A well pipe coupling device, comprising two members having their upper and lower ends, respectively, adapted for connection with pipe lengths and having at their other ends a threaded coupling, the lower one of the members having near its upper end a downwardly facing shoulder suitable for engagement with a casing elevator, and having an elongated stem projecting below said elevator engageable shoulder of sufficient length to accommodate elevator engaging means and slips engaging means simultaneously.

7. A well pipe coupling device, comprising two members having at their upper and lower ends, respectively, threaded couplings adapted for connection with pipe lengths and having at their other ends a threaded coupling whereby the two members may be coupled together, the lower one of said members having near its upper end a downwardly facing shoulder suitable for engagement with a casing elevator, and having an elongated stem projecting below said elevator engageable shoulder of sufficient length to accommodate elevator engaging means immediately below said shoulder and slips engaging means below the elevator but above the threaded coupling at the lower end of the lower member.

In witness that I claim the foregoing I have hereunto subscribed my name this 29th day of January, 1923.

ELIHU C. WILSON.